United States Patent [19]

Hailey et al.

[11] 4,332,066

[45] Jun. 1, 1982

[54] COMPLIANCE MECHANISM

[75] Inventors: Samuel I. Hailey, Fort Worth; George M. Kaler, Jr., Tarrant, both of Tex.

[73] Assignee: General Dynamics Corporation, Fort Worth, Tex.

[21] Appl. No.: 109,855

[22] Filed: Jan. 7, 1980

[51] Int. Cl.³ .............................................. B23B 39/14
[52] U.S. Cl. .................................. 29/26 R; 33/169 C; 408/11; 408/237
[58] Field of Search ..................... 29/26 B, 26 A, 26 R; 408/111, 81, 127, 234, 236, 237, 238; 33/169 C; 414/1, 4, 5, 8, 7; 409/216, 67, 79; 219/125.11

[56] References Cited

U.S. PATENT DOCUMENTS

| | | | |
|---|---|---|---|
| 1,782,633 | 11/1930 | Schiltz | 408/127 |
| 1,790,896 | 2/1931 | Bondy | 408/234 |
| 2,108,699 | 2/1938 | Walther | 408/127 |
| 2,210,128 | 8/1940 | Rohr | 408/81 |
| 2,335,614 | 11/1943 | Spievak | 408/81 X |
| 2,574,016 | 11/1951 | Burg | 408/127 |
| 2,722,812 | 11/1955 | Golasky | 408/127 |
| 2,891,427 | 6/1959 | Warsap et al. | 408/111 |
| 3,220,030 | 11/1965 | Supernor | 408/127 |
| 3,359,008 | 12/1967 | Stimmerman | 408/127 X |
| 3,491,625 | 1/1970 | Schultze | 408/127 |
| 3,945,751 | 3/1976 | Johnson | 408/127 |
| 4,098,001 | 7/1978 | Watson | 33/169 C |
| 4,155,169 | 5/1979 | Drake et al. | 33/169 C |
| 4,202,107 | 5/1980 | Watson | 33/169 C |
| 4,242,017 | 12/1980 | De Fazio | 408/111 |

OTHER PUBLICATIONS

"Remote Center Compliance", D. E. Whitney et al., publication P-728, C. S. Draper Laboratory, Nov. 1978.

Primary Examiner—William R. Briggs
Attorney, Agent, or Firm—Robert A. Felsman; James E. Bradley

[57] ABSTRACT

A tool holder has compliance features that allow a hole to be drilled at high tolerances by a remote controlled control arm. The holes are drilled in a workpiece that has a template secured over it with guide holes for positioning the holes to be drilled. A self-feeding drill of the type that will simultaneously rotate and advance a drill bit is mounted in a support. A sleeve is carried at the forward end of the support for enclosing the drill bit. An index carriage moves the support forwardly into the guide hole after the control arm has substantially aligned the sleeve with the guide hole. Compliance mechanisms in the support allow the entire drill, drill bit and sleeve to move as a unit a limited amount parallel to and angularly with respect to the template and the indexing carriage, to allow advancement of the sleeve into the guide hole even though there may have been initial misalignment. The compliance mechanisms preferably include an inner guide member mounted within an outer guide member. Radially oriented, spring-biased pins retain the outer guide member. Resilient disks mounted in mating cavities retain and allow compliance of the inner guide member.

1 Claim, 5 Drawing Figures

COMPLIANCE MECHANISM

BACKGROUND OF THE INVENTION

1. Field of the Invention:

This invention relates in general to manufacturing tool holders and in particular to a fixture for holding a drill that allows limited floating movement to assure precise alignment of the drill within a template in robotic applications.

2. Description of the Prior Art:

In aircraft manufacturing, certain parts require numerous precisely positioned holes. To maintain tolerances, a template with guide holes is secured over the workpiece or member to be drilled. In one prior art technique, a self-feeding drill is used. The drill has a tube or sleeve on its end that encloses the bit. The sleeve is dimensioned to fit tightly in the guide hole. The operator manually pushes the sleeve into a guide hole. Once in place, the operator actuates the drill, which simultaneously rotates the bit, and advances it into the workpiece. The sleeve avoids wear of a rotating drill bit against a guide hole. This manual drilling is a time consuming operation.

"Robots" having control arms that move to a selected point in space and perform a function are known, such as those that perform certain welds in automobile assembly. Setting up a robot to drill holes in an aircraft member with very close tolerances and over several feet of space has not been done previously, as far as is known to applicants. One problem is that available robots can position a drill bit at a selected point only within 0.050 inch tolerance, insufficient for this type of drilling. The sleeve would not be able to enter the guide hole, which may have a tolerance of only 0.005 inch.

Floating tool holders, or compliance devices, that provide some flexing to aid in alignment are known in the prior art. For example, a driving connection is shown in U.S. Pat. No. 1,782,633 that allows the cutting tool to move angularly and parallel with respect to its drive member. In this patent, however, and in the other patents known to applicants, the entire compliance mechanism is located in the drive train and thus will rotate with the cutting tool. Using this device with a template system would not provide sufficiently close tolerances because clearances would have to be provided in the template guide holes to accomodate the rotation.

SUMMARY OF THE INVENTION

It is accordingly a general object of this invention to provide an improved apparatus for drilling a workpiece with a template.

It is a further object of this invention to provide an improved compliance device that will enable a robot to drill holes at high tolerances through a template.

It is a further object of this invention to provide an improved compliance device that enables angular and parallel movements of a tool with respect to the workpiece.

In accordance with these objects, a compliance device is provided that allows a limited amount of movement of the entire drill, drill bit, and sleeve, as opposed to the flexible chucks known in the prior art. Since the entire drill is shifted, a guide sleeve can be secured to a nonrotating part of the drill.

The compliance device includes an inner guide member mounted inside an outer guide member, which in turn is mounted in a frame. The interface between the inner guide member and the outer guide member contains flexible compliance members allowing angular movement. The interface of the outer guide member to the frame contains flexible compliance members that allow parallel movement. In the preferred embodiment, the angular compliance members comprise resilient disks secured to one guide member and inserted in mating cavities in the other guide member. In the parallel compliance mechanism, spring biased radially oriented pins are urged against the outer guide member.

The control arm and support for the compliance mechanisms have a carriage with indexing means for advancing the sleeve into the guide hole once the robot control arm has positioned the sleeve in substantial alignment. The compliance members allow the sleeve to move a limited amount with respect to the carriage and robot control arm so that the sleeve can enter the guide hole even though it may be slightly misaligned.

DESCRIPTION OF THE PREFERRED EMBODIMENT

Figure 1:
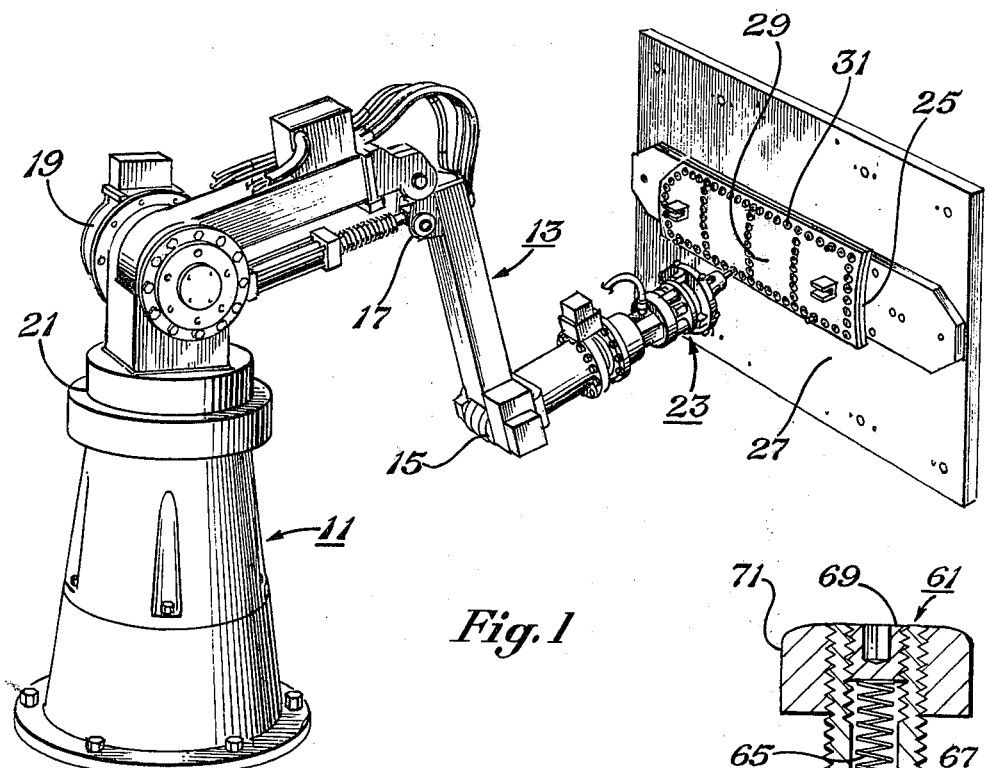
FIG. 1 is a perspective view of a robot drilling system constructed in accordance with this invention.

Referring to FIG. 1, a robot 11 is shown in operation. Robot 11 has a control arm 13 that has movable joints 15, 17, 19, and 21. Other joints provide for yaw and roll adjustments. These joints enable the forward end of the control arm 13 to be moved to a selected given point in space, and pointed in a selected direction, within tolerance limits. A tool holder 23 is releasably secured to its forward end for performing various functions on a workpiece 25, such as an aircraft member.

Figure 2:
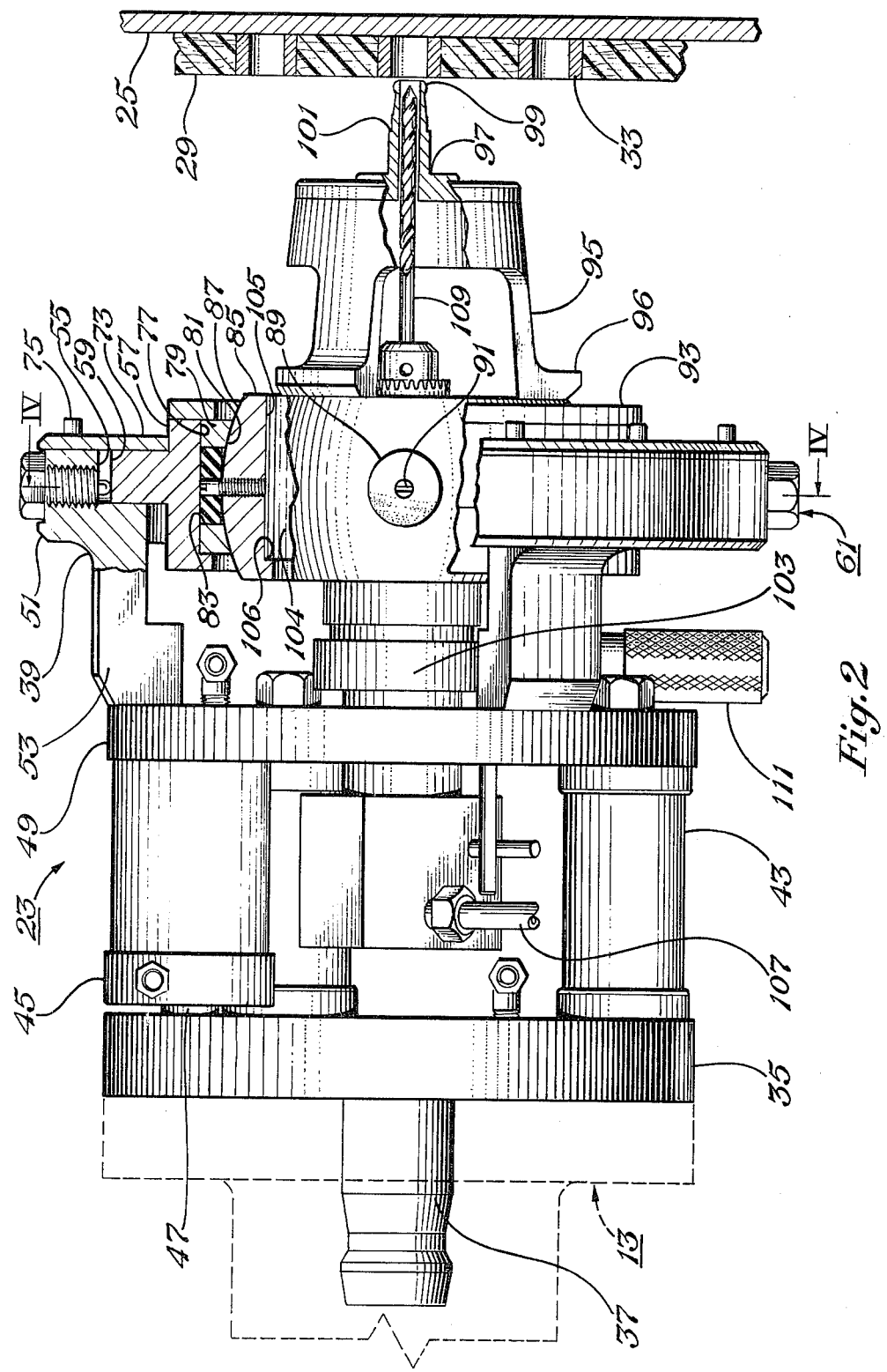
FIG. 2 is a side elevational view, partially in the section, of the tool holder of the robot of FIG. 1.

Workpiece 25 is mounted to a vertical bracket 27. A template 29 containing a plurality of guide holes 31 is bolted to the workpiece 25. As shown in FIG. 2, for drilling metal workpieces 25, template 29 is preferably a composite, nonconductive material. Hard metal bushings 33 are inserted in the guide holes 31 to prevent wear. Bushings 33 are also electrically insulated from workpiece 25.

Figure 3:
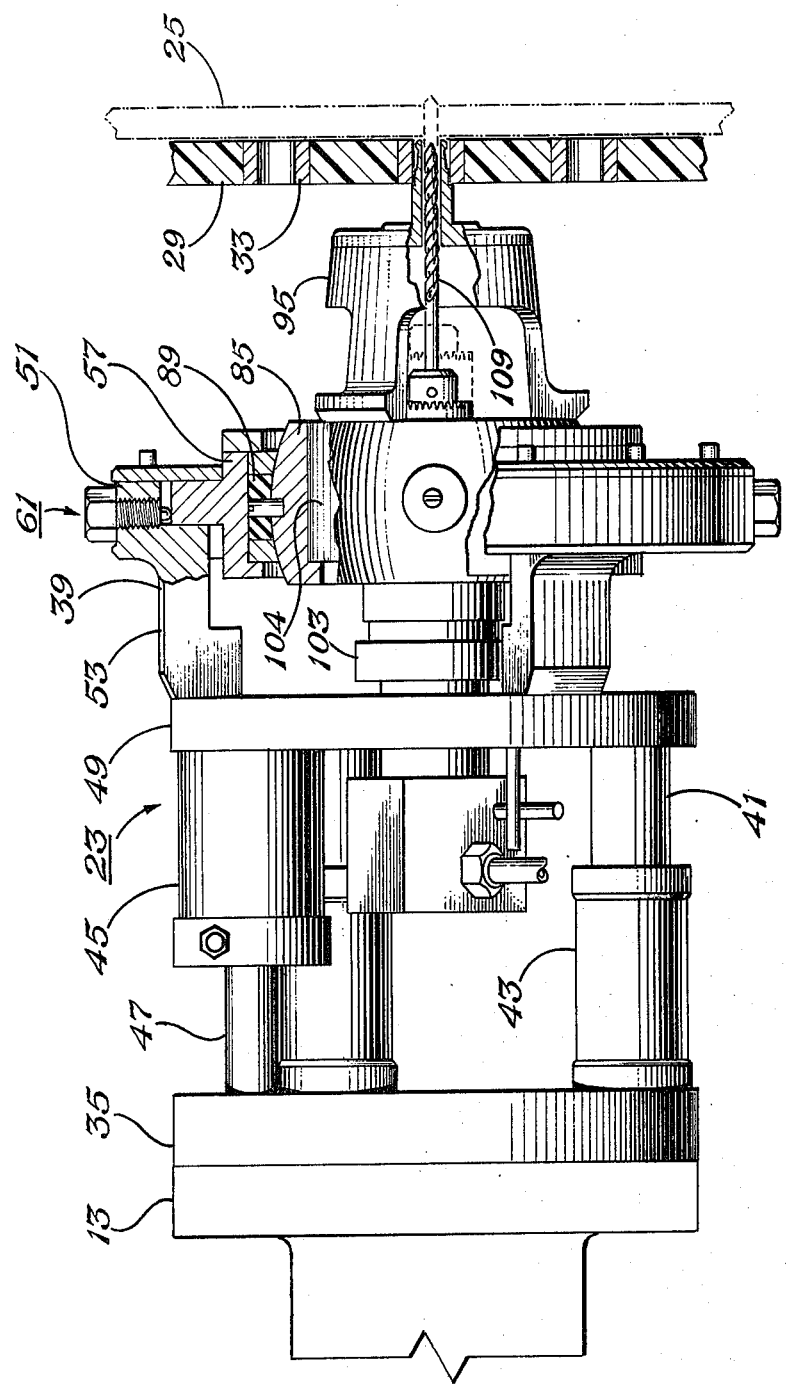
FIG. 3 is a side elevational view of the tool holder of FIG. 2, partially in section, but with the tool holder shown in its extended position.

Tool holder 23 has a carriage 35 with a pin connector 37 extending rearwardly along the central longitudinal axis of carriage 35. The control arm 13 has a quick release mechanism (not shown) for releasably securing the pin connection 37 and the carriage 35 to the control arm 13. Carriage 35 comprises an annular metal plate, and is connected to a frame 39 by three linear bearings (only two shown), each having a shaft 41 telescopingly received in a sleeve 43. An air cylinder 45 is secured to frame 39, and has a piston 47 secured to carriage 35 to serve as power means for moving the frame 39 forwardly with respect to carriage 35 from a retracted position as shown in FIG. 2 to an extended position as shown in FIG. 3. Air cylinder 45 is double acting so as to be able to move frame 39 either forwardly or rearwardly, depending upon the positioning of the pneumatic valve (not shown) that controls it.

Referring again to FIG. 2, frame 39 comprises an intermediate circular plate 49 to which the air cylinder 45 and linear bearing shafts 41 are secured, and a forward circular plate 51. The forward plate 51 is secured to the intermediate plate 49 by three braces 53. Forward plate 51 has an aperture 55 with an axis that coincides with the axis of carriage 35 and pin connection 37.

Figure 5:
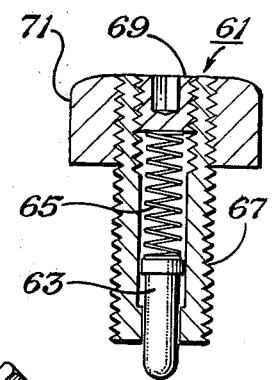
FIG. 5 is a partial sectional view of the tool holder of FIG. 1, taken along the line V—V of FIG. 4.
Figure 4:
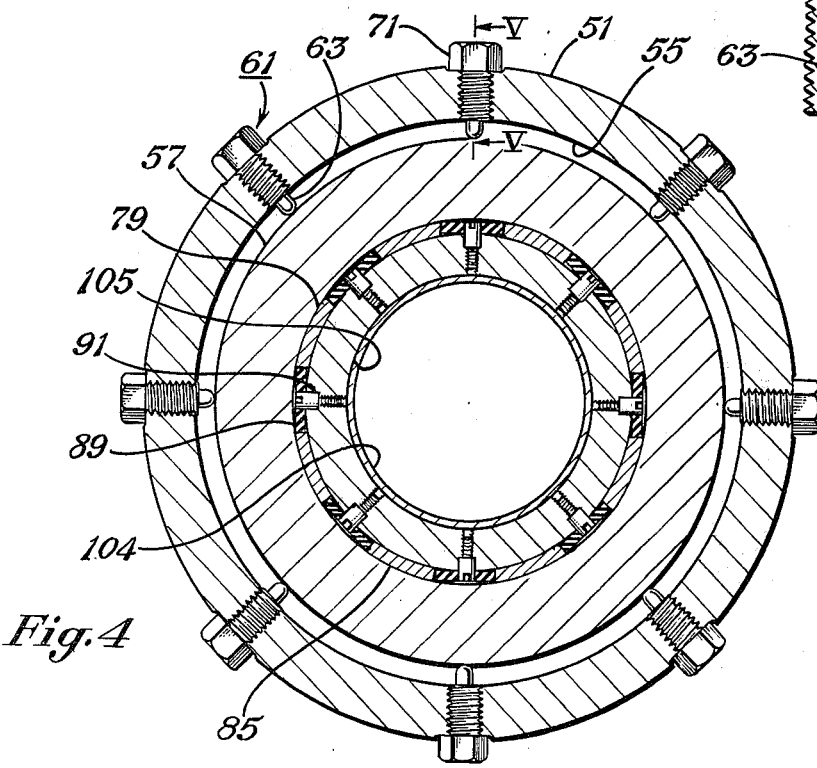
FIG. 4 is a partial sectional view of the tool holder of FIG. 2, taken along the line IV—IV of FIG. 2, and with the internal portions of the drill deleted.

An outer guide member 57 is loosely received in aperture 55. Outer guide member 57 has an annular outer surface 59 that is of a lesser diameter than the diameter of aperture 55. Referring also to FIG. 4, eight spring-biased pin assemblies 61 are secured in holes in the forward plate 51 at equal distances around the periphery. Each pin assembly 61 is radially oriented and bears against the outer surface 59 of the outer guide member 57. Each pin assembly 61, as shown in FIG. 5, includes a pin 63 radially biased inwardly by a coil spring 65. Pin 63 and spring 65 are slidably received within the axial bore of an externally threaded member 67. Spring tension is controlled by a threaded plug 69 secured within internal threads located at the top of the passage that contains the coil spring 65. A lock nut 71 secures the threaded member 67 to the forward plate 51 at the selected point. Pin assemblies 61 are adjusted to coincide the axis of the outer guide member 67 with the axis of the carriage 35. They allow a limited amount of parallel movement of the outer guide member 57, which is defined herein to be movement in a plane perpendicular to the axis of carriage 35.

Referring again to FIG. 2, a retainer plate 73 is secured to the forward side of forward plate 51 by bolts 75 for retaining the outer guide member 57 in aperture 55. Outer guide member 57 has an axial bore or aperture 77 that receives a ring 79. Ring 79 is secured to the outer guide member 57 and is considered herein to be an integral part of the outer guide member 57. Ring 79 has an inner, annular, curved or concave surface 81, when viewed in transverse cross section in a plane parallel with the axis of the outer guide member 57, as shown in FIGS. 2 and 3. Ring 79 also has a plurality of apertures or cavities 83 spaced equally around its concave surface 81.

An inner guide member 85 has an annular outer surface 87 that is curved or concave in transverse cross-section for close, sliding reception within the concave surface 81. A plurality of circular, resilient disks 89 are secured to the concave surface 87 by screws 91. Disks 89 are closely received within cavities 83 of the ring 79. Disks 89 are preferably of silicone rubber, about 0.150 inch thick and of 20 Shore durometer hardness. The disks 89, prior to installation, are about 0.005 to 0.010 inch lesser in diameter than cavities 83, however, silicone oil is placed on them during installation to cause swelling and a very tight fit. The disks 89 are positioned to coincide the axis of the inner guide member 85 with the axis of the outer guide member 57. However, disks 89 allow a limited amount of angular or "pitch and yaw" movement, wherein the axis of the inner guide member 85 is shifted to an angle with respect to the axis of the outer guide member 57 and carriage 35. A retainer plate 93 is secured to the outer guide member 57 by screws (not shown) to retain the inner guide member 85 within ring 79.

A frame 95 has three legs 96 that are rigidly secured to the forward side of the inner guide member 85. A tube or sleeve 97 is mounted to the forward end of frame 95. Sleeve 97 has an axial bore with an axis that always coincides with the axis of the inner guide member 85. Sleeve 97 has an open forward end 99 that is spherical or rounded at the edge and is of lesser diameter than the diameter of the template bushings 33. Sleeve 97 has an intermediate section 101 that is adapted to be very closely received within bushings 33, and is only slightly lesser in diameter, about 0.005 inch. A shoulder at the rearward end of intermediate section 101 is adapted to contact the edge of bushings 33 to stop forward travel of sleeve 97. For metal workpieces 25, the length of sleeve 97 is selected so that the forward end 94 will contact workpiece 25 when fully extended.

A conventional drill 103 has an enlarged cylindrical housing 104 that is adapted to be tightly received within an axial aperture 105 in the inner guide member 85 so that drill 103 moves in unison with the inner guide member 85. The legs 96 of frame 95 extend over the forward side of drill housing 104 to force the rearward edge 104 tightly against an internal shoulder 106 in aperture 105 of the inner guide member 85. The entire drill 103 is supported only by this connection to the inner guide member 85. The rearward end of drill 103 is thus cantilevered.

Drill 103 has a drill motor that is driven by air supplied to a manifold through conduits 107. Drill 103 is a self-feeding type that simultaneously rotates a drill bit 109 and advances it forwardly. Drill 103 is positioned so that when its bit 109 is in the retracted position, as shown in FIG. 2, the tip of bit 109 will be wholly located with sleeve 97. In the extended position, as shown by the dotted lines in FIG. 3, bit 109 will move forwardly and protrude past sleeve 97 to drill a hole in the workpiece 25. Drill 103 is centered so that bit 109 is always located on the axis of sleeve 97 and inner guide member 85. Referring to FIG. 2 a muffler 111 is secured to drill 103 to muffle air exhaust to reduce noise.

In operation, referring to FIG. 1, a workpiece 25 is secured to a bracket 27 by a template 29. A tool holder 23 is inserted onto control arm 13 of the robot 11. Robot 11 is controlled by a computer (not shown) that advances it to the desired hole to be drilled. The control arm 13 will move the tool holder 23 to a point immediately in front of the selected guide hole bushing 33, as shown in FIG. 2. Possibly, sleeve 97 may not be precisely positioned with its axis coinciding with the axis of the bushing 33. Sleeve 97 might be skewed at an angle with respect to the axis of bushing 33. Also, the axis of sleeve 97 might be spaced away from the axis of the bushing 33 in a parallel direction; that is, offset in a plane parallel with the plane of the template. Regardless, however, the control arm 13 will attempt to insert the sleeve 97 into the bushing 33.

In doing this, a separate computer control signals the air valve to supply air to the air cylinder 45 to index the frame 39 forward with respect to the carriage 35, as shown in the steps from FIG. 2 to FIG. 3. The rounded nose 99 of sleeve 97 will guide the sleeve 97 into the bushing 33 normally if an outer edge portion of nose 99 contacts an inner edge portion of the bushing 33. Experiments have determined that the axis of sleeve 97 may be as much as 0.150 inch off from the axis of bushing 33 in parallel directions, and still be able to accomplish insertion. When it is fully inserted, as shown in FIG. 3, the intermediate section 101 will be wholly located within bushing 33, with the shoulder of the intermediate section preventing further travel of the sleeve 97.

During insertion, if the sleeve 97 were initially misaligned, the pin assemblies 61 would have allowed the outer guide member 57 to move a limited amount in the plane that it is located in, this plane being perpendicular to the axis of carriage 35. Referring to FIG. 4, some of the pins 63 would compress their coil springs 65 more than others, to accommodate this parallel movement. At the same time, if the axis of the carriage 35 happens to be at an angle with respect to the axis of the bushing 33, rather than parallel or coinciding, disks 89 will deform, allowing a certain amount of angular movement of the inner guide member 85 with respect to the axis of carriage 35. These compliance mechanisms allow parallel and angular movement of sleeve 97 and drill 103 with respect to the axis of carriage 35, since carriage 35 and control arm 13 remain stationary during insertion of sleeve 97.

Once sleeve 97 is fully received within bushing 33, a signal is supplied to the drill 103 to rotate the bit 109 and advance it into the workpiece 25, as shown in FIG. 3. If the workpiece is metal as shown, this signal may be accomplished by initially providing the workpiece 25 with a small voltage potential and placing sleeve 97 at ground. The circuit completes once sleeve 97 is fully received within the template 29 and in contact with workpiece 25. If the workpiece is a composite material, the template is constructed entirely from metal and placed at ground. Coil spring contacts may be mounted to the forward end of frame 95 and provided with a small voltage potential. When they contact the template 29, the sleeve 97 will be in place and the circuit completed to signal the control circuitry to energize drill 103. After the hole is drilled, a signal is provided through a conventional sensor to stop drill 103 and retract bit 109. Once retracted, a signal is provided to the valves that control air cylinder 45 through a conventional sensor to retract frame 39. Once sleeve 97 is withdrawn, pin assemblies 61 and disks 89 return drill bit 109 to the zero position. In the zero position, the axis of sleeve 97 coincides with the axis of carriage 35.

Frame 39 serves as supporting means for carrying the drill 103, while the outer guide member 57 and inner guide member 85, along with pin assemblies 61 and disks 89 serve as compliance means for allowing the sleeve 97, drill 103 and drill bit 109 to move as a unit a limited amount parallel to and angularly with respect to template 29 and carriage 35. Carriage 35, linear bearings 43, air cylinder 45, and the associated control circuitry, serve as indexing means for advancing the sleeve 97 into one of the guide holes 31. Pin assemblies 61 and the enlarged aperture 55 serve as parallel compliance means for urging the outer guide member axis to coincide with the frame axis, and for allowing a limited amount of parallel movement of the outer guide member axis with respect to the frame axis.

Disks 89 and the inner guide member 85 serve as angular compliance means for urging the drill 103 axis to coincide with the outer guide member 57 axis, and for allowing a limited amount of angular movement of the drill with respect to the outer guide member axis. The concave surface 81 of the outer guide member 57 and the concave surface 87 of the inner guide member 85 provide a first interface for a compliance mechanism. The outer surface 59 of the outer guide member 57 and the aperture 55 of the frame forward plate 51 provide a second interface for a compliance mechanism.

It should be apparent that an invention having significant advantages has been provided. By mounting an entire, self-feeding drill within a compliance device, applicants are able to utilize a robot control arm for drilling through a guide at much closer tolerances than the control arm would normally be capable of achieving. The compliance mechanism effectively allows parallel and angular movement and returns the drill bit to zero after each hole is drilled.

While the invention has been shown in only one of its forms, it should be apparent to those skilled in the art that it is not so limited but is susceptible to various changes and modifications without departing from the spirit thereof.

We claim:

1. An apparatus for drilling holes in a workpiece using a self-feeding drill of the type that will simultaneously rotate and advance a drill bit from a retracted position to an extended position, the workpiece having a template secured to it that has guide holes, the apparatus comprising in combination:

an inner guide member having an axial aperture for rigidly carrying a drill for movement therewith, the inner guide member having an annular outer surface that is convex in cross-section;

an outer guide member having an annular inner surface that is concave in cross-section for slidingly receiving the outer surface of the inner guide member, the outer guide member having an annular outer surface, the outer guide member having a plurality of cavities in its inner surface;

a plurality of resilient disks secured to the outer surface of the inner guide member and dimensioned for close reception in the cavities;

a frame having an aperture for receiving and carrying the outer guide member;

a plurality of radially oriented and inwardly biased pins secured to the frame and bearing against the outer surface of the outer guide member;

a sleeve rigidly secured to the forward side of the inner guide member and adapted to receive the drill bit;

a carriage having connection means for securing to a control arm means for aligning the sleeve with a selected guide hole, the carriage carrying the frame by a linear bearing; and power means for selectively moving the frame forwardly with respect to the carriage to insert the sleeve into one of the guide holes, the disks allowing a limited amount of angular movement of the sleeve with respect to the carriage, and the pins allowing a limited amount of parallel movement of the sleeve with respect to the carriage to allow insertion even though the control arm means may have slidingly misaligned the sleeve.

* * * * *